United States Patent
DiTomasso

(10) Patent No.: US 10,927,686 B2
(45) Date of Patent: Feb. 23, 2021

(54) COMPRESSOR ROTOR STACK ASSEMBLY FOR GAS TURBINE ENGINE

(71) Applicant: United Technologies Corporation, Farmington, CT (US)

(72) Inventor: John C. DiTomasso, Glastonbury, CT (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 0 days.

(21) Appl. No.: 16/811,666

(22) Filed: Mar. 6, 2020

(65) Prior Publication Data

US 2020/0208531 A1     Jul. 2, 2020

Related U.S. Application Data

(63) Continuation of application No. 15/650,066, filed on Jul. 14, 2017, now Pat. No. 10,584,599.

(51) Int. Cl.
*F01D 5/30* (2006.01)
*F01D 5/02* (2006.01)
*F01D 5/06* (2006.01)

(52) U.S. Cl.
CPC ............... *F01D 5/30* (2013.01); *F01D 5/025* (2013.01); *F01D 5/06* (2013.01); *F01D 5/066* (2013.01); *F01D 5/022* (2013.01); *F05B 2220/302* (2013.01); *F05B 2240/24* (2013.01); *F05B 2240/80* (2013.01); *F05D 2220/32* (2013.01); *F05D 2230/60* (2013.01)

(58) Field of Classification Search
None
See application file for complete search history.

(56) References Cited

U.S. PATENT DOCUMENTS

| 2,452,782 | A |   | 11/1948 | McLeod et al. |
| 2,610,786 | A | * | 9/1952  | Howard ............... F01D 5/066 |
|           |   |   |         | 415/209.1 |

(Continued)

FOREIGN PATENT DOCUMENTS

| EP | 1591623 A2 | 11/2005 |
| EP | 2927425 A1 | 10/2015 |
| GB | 610314 A   | 10/1948 |

OTHER PUBLICATIONS

Search Report regarding related EP App. No. 18183755.0; dated Oct. 8, 2018; 8 pgs.

*Primary Examiner* — Eldon T Brockman
(74) *Attorney, Agent, or Firm* — Cantor Colburn LLP

(57) ABSTRACT

A compressor rotor assembly including a plurality of rotor disks axially spaced from each other, each rotor disk extending radially from an inner end to an outer end. Also included is a spacer extending axially from each rotor disk to engage an adjacent spacer extending from an adjacent rotor disk, the spacer and adjacent spacer disposed proximate the outer end of the respective rotor disks, the spacers forming an outer backbone of the compressor rotor assembly. Further included is an inner backbone of the compressor rotor assembly, the inner backbone comprising a plurality of backbone segments, each of the backbone segments extending axially from each rotor disk to engage an adjacent backbone segment extending from an adjacent rotor disk, the backbone segment and the adjacent backbone segment disposed proximate the inner end of the respective rotor disks.

20 Claims, 2 Drawing Sheets

(56) References Cited

U.S. PATENT DOCUMENTS

| | | | |
|---|---|---|---|
| 2,928,649 A | | 3/1960 | Lombard et al. |
| 3,154,243 A | | 10/1964 | Koff |
| 3,295,825 A | | 1/1967 | Hall |
| 3,356,339 A | | 12/1967 | Thomas et al. |
| 4,127,359 A | | 11/1978 | Stephan |
| 5,220,784 A | | 6/1993 | Wilcox |
| 5,267,397 A | * | 12/1993 | Wilcox .................. B63H 21/16 29/889.1 |
| 5,350,278 A | | 9/1994 | Burge |
| 6,089,827 A | | 7/2000 | Ichiryu et al. |
| 7,186,079 B2 | | 3/2007 | Suciu et al. |
| 7,309,210 B2 | * | 12/2007 | Suciu ...................... F01D 5/066 415/174.2 |
| 7,448,221 B2 | | 11/2008 | Suciu et al. |
| 7,540,713 B1 | | 6/2009 | Marussich |
| 8,235,656 B2 | | 8/2012 | Wilson et al. |
| 8,956,120 B2 | | 2/2015 | Giametta |
| 10,077,663 B2 | * | 9/2018 | Malmborg .............. F01D 5/066 |
| 2006/0099070 A1 | | 5/2006 | Suciu et al. |
| 2006/0130456 A1 | * | 6/2006 | Suciu .................... F01D 11/001 60/226.1 |
| 2013/0081406 A1 | * | 4/2013 | Malmborg .............. F01D 5/066 60/805 |
| 2014/0064946 A1 | | 3/2014 | Nielsen et al. |
| 2014/0140849 A1 | | 5/2014 | Muscat et al. |
| 2017/0002834 A1 | * | 1/2017 | Powell .................. F04D 27/002 |
| 2019/0017516 A1 | | 1/2019 | Ditomasso |

\* cited by examiner

COMPRESSOR ROTOR STACK ASSEMBLY FOR GAS TURBINE ENGINE

CROSS-REFERENCE TO RELATED APPLICATIONS

This application is a Continuation Application of U.S. application Ser. No. 15/650,066 filed Jul. 14, 2017, the disclosure of which is incorporated herein by reference in its entirety.

BACKGROUND

Exemplary embodiments pertain to the art of gas turbine engines and, more particularly, to a compressor rotor stack assembly for gas turbine engines.

A gas turbine engine typically includes one or more rotor stacks associated with one or more sections of the engine. A rotor stack may include several longitudinally spaced apart blade-carrying disks of successive stages of the section. A stator structure may include circumferential stages of vanes longitudinally interspersed with the rotor disks. The rotor disks are secured to each other against relative rotation and the rotor stack is secured against rotation relative to other components on its common spool (e.g., the low and high speed/pressure spools of the engine).

Numerous systems have been used to tie rotor disks together. For example, a bore tied configuration may be employed, but a massive compressive load is put on the rotor backbone, which is located proximate a radially outer end of the rotor disks. The backbone may become bowed, such that the compressive load puts the backbone into bending, thus forcing the backbone structure to be very thick. Gas turbine engines are being required to spin faster than previously required, thus emphasizing the need to reduce rotor stress by eliminating as much mass as possible from high radius regions.

BRIEF DESCRIPTION

Disclosed is a compressor rotor assembly including a plurality of rotor disks axially spaced from each other, each rotor disk extending radially from an inner end to an outer end. Also included is a spacer extending axially from each rotor disk to engage an adjacent spacer extending from an adjacent rotor disk, the spacer and adjacent spacer disposed proximate the outer end of the respective rotor disks, the spacers forming an outer backbone of the compressor rotor assembly. Further included is an inner backbone of the compressor rotor assembly, the inner backbone comprising a plurality of backbone segments, each of the backbone segments extending axially from each rotor disk to engage an adjacent backbone segment extending from an adjacent rotor disk, the backbone segment and the adjacent backbone segment disposed proximate the inner end of the respective rotor disks.

In addition to one or more of the features described above, or as an alternative, further embodiments may include a tie shaft extending axially proximate the inner end of the plurality of rotor disks to axially compress the plurality of rotor disks together.

In addition to one or more of the features described above, or as an alternative, further embodiments may include that the plurality of rotor disks are part of a high pressure compressor assembly.

In addition to one or more of the features described above, or as an alternative, further embodiments may include that the tie shaft is threaded to a compressor structure proximate a last stage of the plurality of rotor disks.

In addition to one or more of the features described above, or as an alternative, further embodiments may include that the inner backbone defines a substantially cylindrical member.

In addition to one or more of the features described above, or as an alternative, further embodiments may include that the plurality of rotor disks are not bolted together.

Also disclosed is a gas turbine engine including a compressor section, a combustion section, a turbine section and a rotor disk assembly of the compressor section. The rotor disk assembly includes a plurality of rotor disks, each extending radially from an inner end to an outer end. The rotor disk assembly also includes a spacer extending axially from each rotor disk to engage an adjacent spacer extending from an adjacent rotor disk, the spacer and adjacent spacer disposed proximate the outer end of the respective rotor disks, the spacers forming an outer backbone of the compressor rotor assembly. The rotor disk assembly further includes an inner backbone of the compressor rotor assembly, the inner backbone comprising a plurality of backbone segments, each of the backbone segments extending axially from each rotor disk to engage an adjacent backbone segment extending from an adjacent rotor disk, the backbone segment and the adjacent backbone segment disposed proximate the inner end of the respective rotor disks. The rotor disk assembly yet further includes a tie shaft extending axially proximate the inner end of the plurality of rotor disks to axially compress the plurality of rotor disks together.

In addition to one or more of the features described above, or as an alternative, further embodiments may include that the plurality of rotor disks are part of a high pressure compressor assembly.

In addition to one or more of the features described above, or as an alternative, further embodiments may include that the tie shaft is threaded to a compressor structure proximate a last stage of the plurality of rotor disks.

In addition to one or more of the features described above, or as an alternative, further embodiments may include that the inner backbone defines a substantially cylindrical member.

In addition to one or more of the features described above, or as an alternative, further embodiments may include that the plurality of rotor disks are not bolted together.

Further disclosed is a method of assembling a compressor rotor assembly. The method includes arranging a plurality of rotor disks in an axially spaced manner relative to each other. The method also includes engaging a spacer extending from each rotor disk with an adjacent spacer extending from an adjacent rotor disk, the spacers disposed proximate a radially outer end of the rotor disks. The method further includes engaging a backbone segment extending from each rotor disk with an adjacent backbone segment extending from an adjacent backbone segment to form an inner backbone, the backbone segments disposed proximate a radially inner end of the rotor disks. The method yet further includes axially compressing the spacers and the inner backbone with a tie shaft with a positive torque applied thereto.

In addition to one or more of the features described above, or as an alternative, further embodiments may include that the tie shaft is threaded to a compressor structure proximate a last stage of the plurality of rotor disks.

In addition to one or more of the features described above, or as an alternative, further embodiments may include that the inner backbone defines a substantially cylindrical member.

In addition to one or more of the features described above, or as an alternative, further embodiments may include that the plurality of rotor disks are not bolted together.

In addition to one or more of the features described above, or as an alternative, further embodiments may include that the plurality of rotor disks are part of a high pressure compressor assembly.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
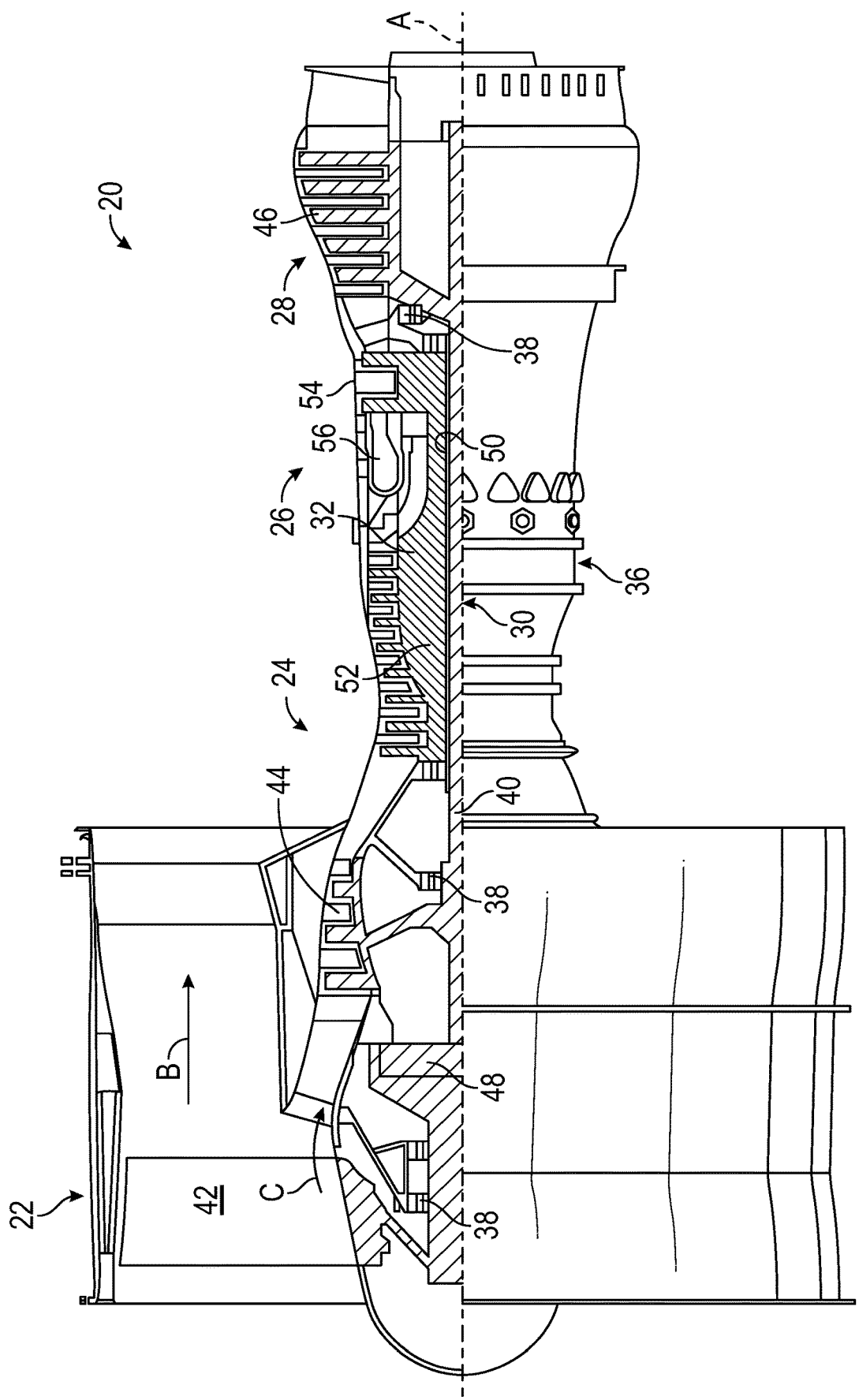
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second (350.5 m/sec).

Figure 2:
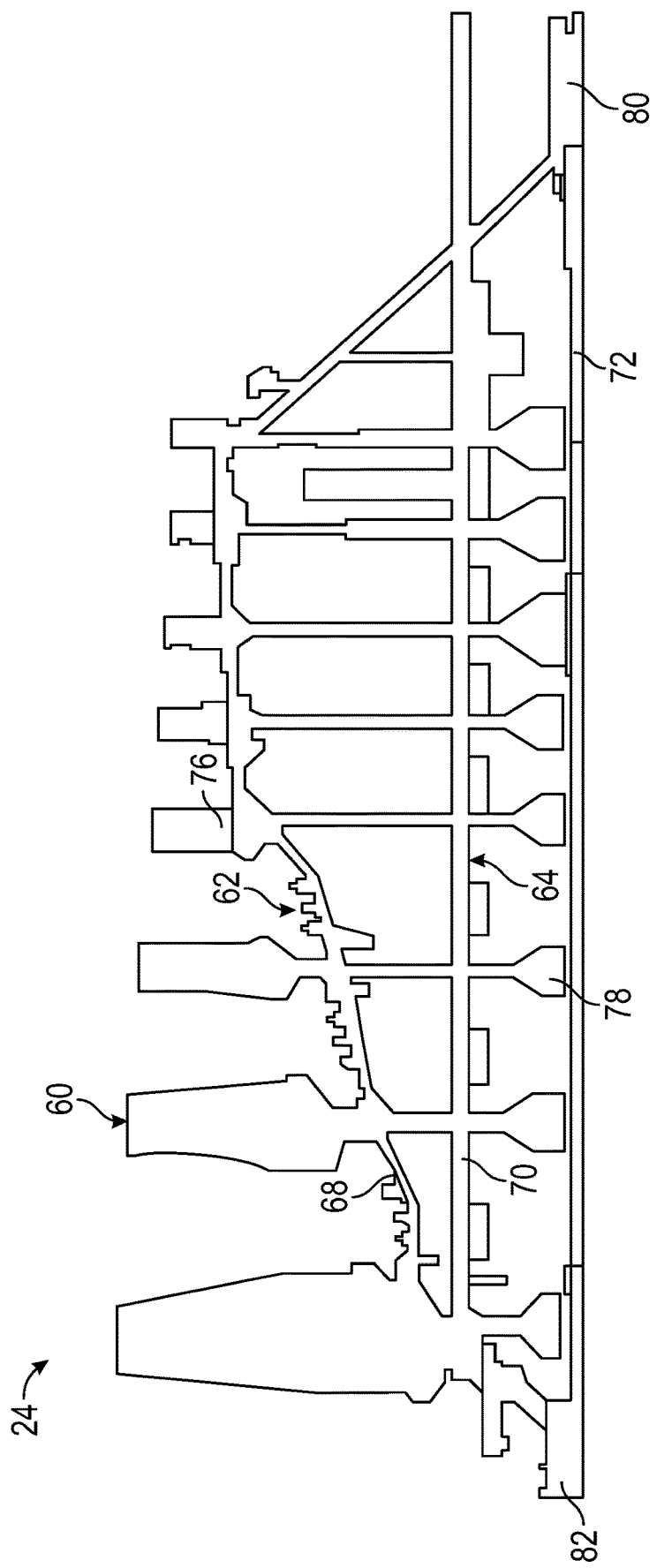
FIG. 2 is an elevational view of a rotor assembly of the gas turbine engine.

Referring now to FIG. 2, a portion of the compressor section 24 is illustrated and may be referred to as a compressor rotor assembly or a compressor rotor stack assembly. The compressor rotor assembly 24 includes a plurality of axially spaced rotor disks 60. Each illustrated rotor disk is one of a plurality of circumferentially spaced disks that form various stages of the compressor section 24. It is to be appreciated that more or less stages may be present when compared to the illustrated embodiment. In some embodiments, the compressor rotor assembly 24 described herein is the high pressure compressor 52.

The rotor disks 60 are operatively coupled to one another in the manner described herein. In particular, a radially outer backbone 62 and a radially inner backbone 64 are axially compressed with at least one fastener. The radially outer backbone 62 is formed with a plurality of spacers 68. The spacers 68 are integrally formed with, and extend axially from the rotor disks 60. Specifically, each rotor disk 60 includes a spacer extending therefrom that is engaged with an adjacent spacer that extends axially from an adjacent rotor disk. Similarly, the radially inner backbone 64 is formed of a plurality of backbone segments 70 that are integrally formed with, and extend axially from the rotor disks 60. Specifically, each rotor disk includes a backbone segment extending therefrom that is engaged with an adjacent backbone segment that extends axially from an adjacent rotor disk. As illustrated, the spacers 68 are located proximate a radially outer end 76 of the rotor disks 60 and the backbone segments 70 are located proximate a radially inner end 78 of the rotor disks 60.

As shown in the sectional view, the radially outer backbone 62 has an irregular geometric configuration, while the radially inner backbone 64 is a cylindrical structure. A fastener, such as a tie shaft 72, is disposed in engagement with the radially inner backbone 64 and the radially outer backbone 62 to axially compress the backbones in a manner that secures the rotor disks 60 to each other. By including the radially inner backbone 64, less of a compressive force must be fully absorbed by the radially outer backbone 62. This allows the thickness of the spacers 68 (i.e., radially outer backbone 62) to be significantly reduced, thereby reducing overall weight of the assembly. The radially inner backbone 64 is substantially cylindrical so it may absorb the compressive load applied by the tie shaft 72 in an efficient manner that avoids bending of the backbone segments 70 (i.e., radially inner backbone 64).

The tie shaft 72 is axially oriented along the radially inner end 78 of the rotor disks 60. In some embodiments, the tie shaft 72 is coupled to the assembly by threading the tie shaft 72 to a portion of the compressor structure, such as the portion referenced with numeral 80 in FIG. 2 and located proximate a last stage of the compressor section 24. In some embodiments, threaded engagement is also present proximate an upstream stage, such as with the portion of the compressor section referenced with numeral 82. Additional or alternative engagement sections are contemplated.

Axially compressing the rotor disks with the tie shaft 72 alleviates the need for bolted joints that are often required for rotor disk coupling. This significantly reduces the overall weight of the assembly. Therefore, the rotor disk coupling process does not include bolting the disks together to achieve the weight reduction. Furthermore, no complex welds are required, thereby simplifying the assembly process. The combination of an inner backbone to absorb the compressive load and the securing with a tie shaft 72 provides the advantages discussed above.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compressor assembly comprising:
   a compressor section defining a compressor structure; and
   a rotor disk assembly of the compressor section comprising:
     a plurality of rotor disks, each extending radially from an inner end to an outer end;
     a spacer extending axially from each rotor disk to engage an adjacent spacer extending from an adjacent rotor disk, the spacer and the adjacent spacer disposed proximate the outer end of a respective rotor disk, the spacers forming an outer backbone of the compressor structure;
     an inner backbone of the compressor structure, the inner backbone comprising a plurality of backbone segments being axially aligned with one another and engaged with one another to define the inner backbone, each of the backbone segments extending axially from each rotor disk to engage an adjacent backbone segment extending from the adjacent rotor disk, each backbone segment of the plurality of backbone segments being disposed proximate the inner end of the respective rotor disk; and
     a tie shaft extending axially within the compressor structure proximate the inner end of the plurality of rotor disks and opposite the outer end, the tie shaft being threaded to the compressor structure to axially compress the plurality of rotor disks together.

2. The compressor assembly of claim 1, wherein the inner backbone is disposed radially between the outer backbone and the tie shaft.

3. The compressor assembly of claim 1, wherein a one of the plurality of rotor disks has respective axial sides and a distance between the outer backbone and the inner backbone is different for the respective axial sides.

4. The compressor assembly of claim 3, wherein the inner backbone defines a substantially cylindrical member.

5. The compressor assembly of claim 4, wherein the distance is larger for a one of the respective sides closer to a last stage of the compressor section.

6. The compressor assembly of claim 3, wherein the distance is larger for a one of the respective sides closer to a last stage of the compressor section.

7. The compressor assembly of claim 6, wherein the inner backbone defines a substantially cylindrical member.

8. The compressor assembly of claim 1, wherein the plurality of rotor disks are part of a high pressure compressor assembly.

9. A compressor assembly comprising:

a compressor section defining a compressor structure; and a rotor disk assembly of the compressor section comprising:

a plurality of rotor disks, each extending radially from an inner end to an outer end;

a spacer extending axially from each rotor disk to engage an adjacent spacer extending from an adjacent rotor disk, the spacer and the adjacent spacer disposed proximate the outer end of a respective rotor disk, the spacers forming an outer backbone of the compressor structure;

an inner backbone of the compressor structure, the inner backbone comprising a plurality of backbone segments being axially aligned with one another and engaged with one another to define the inner backbone, each of the backbone segments extending axially from each rotor disk to engage an adjacent backbone segment extending from the adjacent rotor disk, each backbone segment of the plurality of backbone segments being disposed proximate the inner end of the respective rotor disk, a one of the plurality of rotor disks has respective axial sides and a distance between the outer backbone and the inner backbone is different for the respective axial sides; and a tie shaft extending axially within the compressor structure proximate the inner end of the plurality of rotor disks and opposite the outer end, the tie shaft being threaded to the compressor structure to axially compress the plurality of rotor disks together.

10. The compressor assembly of claim 9, wherein the inner backbone is disposed radially between the outer backbone and the tie shaft.

11. The compressor assembly of claim 9, wherein the inner backbone defines a substantially cylindrical member.

12. The compressor assembly of claim 11, wherein the distance is larger for a one of the respective sides closer to a last stage of the compressor section.

13. The compressor assembly of claim 9, wherein the distance is larger for a one of the respective sides closer to a last stage of the compressor section.

14. The compressor assembly of claim 13, wherein the inner backbone defines a substantially cylindrical member.

15. A method of assembling a compressor rotor assembly comprising:

arranging a plurality of rotor disks in an axially spaced manner relative to each other, each extending radially from an inner end to an outer end;

engaging a spacer extending from each rotor disk with an adjacent spacer extending from an adjacent rotor disk, the spacers disposed proximate a radially outer end of the rotor disks;

forming an outer backbone of the compressor rotor assembly with the spacers.

engaging a backbone segment extending from each rotor disk with an adjacent backbone segment extending from the adjacent rotor disk to form an inner backbone, the backbone segment disposed proximate a radially inner end of the rotor disks, the backbone segment being axially aligned with one another and engaged with one another; and axially compressing the spacers and the inner backbone with a tie shaft extending axially along the compressor rotor assembly, radially substantially near the inner end of the plurality of rotor disks opposite the outer end with a positive torque thereby threading the tie shaft to a compressor structure.

16. The method of claim 15, wherein the inner backbone is disposed radially between the outer backbone and the tie shaft.

17. The method of claim 15, wherein a one of the plurality of rotor disks has respective axial sides and a distance between the outer backbone and the inner backbone is different for the respective axial sides.

18. The method of claim 17, wherein the inner backbone defines a substantially cylindrical member.

19. The method of claim 17, wherein the distance is larger for a one of the respective sides closer to a last stage of the compressor rotor assembly.

20. The method of claim 15, wherein the plurality of rotor disks are part of a high pressure compressor assembly.

* * * * *